UNITED STATES PATENT OFFICE.

GEORGE O. CURME, JR., OF PITTSBURGH, PENNSYLVANIA, ASSIGNOR TO UNION CARBIDE COMPANY, OF NEW YORK, N. Y., A CORPORATION OF VIRGINIA.

PROCESS OF MAKING PROPYLENE DICHLORID.

1,315,547.  Specification of Letters Patent.  Patented Sept. 9, 1919.

No Drawing.  Application filed February 10, 1919. Serial No. 276,196.

*To all whom it may concern:*

Be it known that I, GEORGE O. CURME, Jr., a citizen of the United States, residing at Pittsburgh, in the county of Allegheny and State of Pennsylvania, have invented certain new and useful Improvements in Processes of Making Propylene Dichlorid, of which the following is a specification.

In my prior application Serial Number 101,637, filed June 3, 1916, I have described and claimed the preparation of ethlene dichlorid by the reaction of ethylene upon chlorin in liquid phase, the ethylene being either in the gaseous or in the liquid phase.

According to the present invention chlorin in liquid phase is employed for the conversion of propylene into propylene dichlorid, or mixtures of propylene dichlorid with higher chlorination products. Inasmuch as propylene is much more readily chlorinated than is ethylene to chlorids higher than the desired dichlorid, the problem presented is a somewhat different one; and the advantageous procedure according to my invention, when propylene dichlorid is the principal product desired, is to add chlorin in liquid phase to an initial excess of liquid propylene. However, as hereinafter pointed out the invention is not restricted to this particular procedure.

It is well known that propylene and chlorin combine to produce propylene dichlorid, according to the equation:

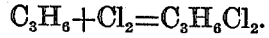

This reaction may be carried out in many ways, the method chiefly employed heretofore being to mix the two bodies in the gaseous phase, and to permit the reaction to proceed in presence of a catalyst either at ordinary or higher temperatures.

I have discovered that propylene and chlorin may be caused to react smoothly, and far more rapidly when the chlorin is present in the liquid phase. The propylene may be introduced either in the liquid or in the gaseous phase.

As one specific example of my invention, pure chlorin (boiling point $-33.5°$ C. at one atmosphere pressure) was first liquefied in a vessel cooled to about $-78°$ C.; gaseous propylene was thereupon supplied through a tube extending to the bottom of the vessel. At the operating temperature the propylene (boiling point $-49°$ C. at one atmosphere pressure) became liquefied before admixture with the chlorin. The procedure consisted therefore in adding liquid propylene to an initial excess of liquid chlorin. The reaction occurred rapidly, and after approximately the theoretical proportion of propylene had been introduced there remained in the vessel a colorless liquid reaction product, strongly charged with hydrochloric acid. This product proved on examination to consist chiefly of propylene dichlorid (boiling point 96° C.), but containing also some 15–20% of higher boiling bodies, chiefly higher chlorinated derivatives of propylene such as tri-chlor-propylene. These may be regarded as derived from propylene dichlorid by further chlorination with elimination of hydrochloric acid. The reaction proceeded with an ease, rapidity and completeness far surpassing the procedure involving the use of chlorin and propylene in gaseous phase.

In case propyiene dichlorid is the sole product desired, and the formation of higher chlorination products is therefore to be avoided, a more advantageous procedure consists in introducing liquid chlorin into an initial excess of liquid propylene. The relation between the boiling points (or vapor pressure curves) of the two substances is such that this may be accomplished, affording conditions under which chlorin is at no time in excess relative to the propylene, or in which if desired a slight excess of chlorin may be supplied at the end of the reaction to insure its substantial completion.

A further possible procedure would be to bring gaseous propylene into reacting relation with liquid chlorin, for since liquid chlorin has the higher boiling point, propylene remains a gas at a certain temperature range at which chlorin is a liquid. This is due to the fact that at atmospheric pressure chlorin liquefies at $-33.5°$ C., whereas propylene is gaseous at temperatures as low as $-49°$ C. at the same pressure. This procedure, however, is practically equivalent to that first described above.

The addition of gaseous chlorin to liquid propylene is not attainable, inasmuch as chlorin exists as a liquid under all conditions under which propylene exists as a liquid.

In the foregoing discussion substantially pure chlorin and pure propylene have been considered. The chlorin or propylene may however equally well be dissolved in or diluted by a solvent such for example as carbon tetrachlorid, which can later be separated from the propylene dichlorid; or, more advantageously, propylene dichlorid itself may be used as the solvent or diluent.

It is to be understood that the practice of the invention is not limited to carrying out the reaction at or near atmospheric pressure, and at a temperature below the boiling point of chlorin and propylene at this pressure. Higher temperature ranges may be employed, provided the pressure is properly adjusted to insure that the chlorin, or the chlorin and the propylene, exist in the liquid phase at the temperature used. In other words, the liquefaction may be brought about by the application of higher pressures, or by reduction of temperature, or by both of these expedients simultaneously applied.

I claim:—

1. Process of producing chlorination products of propylene which consists in reacting with propylene upon chlorin in liquid phase.

2. Process of producing propylene dichlorid which consists in adding liquid chlorin to an initial excess of liquid propylene.

In testimony whereof I affix my signature in presence of two witnesses.

GEORGE O. CURME, Jr.

Witnesses:
DAVID S. PRATT,
W. A. HAMOR.